United States Patent [19]

Bailey et al.

[11] Patent Number: 4,646,140
[45] Date of Patent: Feb. 24, 1987

[54] TELEVISION CAMERAS

[75] Inventors: Philip C. Bailey, Chelmsford; Vaughan N. Kitchin, Colchester, both of United Kingdom

[73] Assignee: English Electric Valve Company Limited, Chelmsford, England

[21] Appl. No.: 779,463

[22] Filed: Sep. 24, 1985

[30] Foreign Application Priority Data

Sep. 25, 1984 [GB] United Kingdom ................ 8424225

[51] Int. Cl.⁴ ........................ H04N 9/09; H04N 7/18; H04N 5/38
[52] U.S. Cl. ..................................... 358/50; 358/108; 358/211
[58] Field of Search .................... 358/50, 55, 108, 113, 358/200, 211, 226

[56] References Cited

U.S. PATENT DOCUMENTS 3,653,747  4/1972  Kogelnik ........................ 358/55 X
3,891,795  6/1975  Johnson et al. ..................... 358/108
3,975,760  8/1976  Yamanaka et al. ............... 358/50 X

FOREIGN PATENT DOCUMENTS 55685  4/1980  Japan ..................................... 358/50
138983  10/1980  Japan ..................................... 358/50

OTHER PUBLICATIONS

RCA Technical Notes, Jun. 1959, No. 268, Image Intensifier, Morton et al.

Primary Examiner—Donald A. Griffin
Attorney, Agent, or Firm—Spencer & Frank

[57] ABSTRACT

Television cameras using solid-state image sensors may be required to provide a good image of a scene under all normal night and day ambient light conditions. The available solid-state image sensors can cope satisfactorily with normal daylight, but do not have sufficient sensitivity to operate under night time conditions, so it is common to amplify the incident illumination with an image intensifier. To stop the intensifier from becoming overloaded by daylight, neutral density optical filters can be moved in front of the intensifier as the light level increases, but this is not a satisfactory solution. The invention proposes a camera incorporating two solid-state sensors, one of which is intensified and one of which is not, in the same camera head, and "switching" one or the other into operation (depending upon the ambient lighting conditions) by switching the light received by the camera to the appropriate sensor.

7 Claims, 6 Drawing Figures

TELEVISION CAMERAS

BACKGROUND OF THE INVENTION

(1) Field of the Invention

This invention concerns televison cameras, and which are relates in particular to such cameras using solidstate image sensors and required to provide a good image of a scene under all normal night and day ambient light condition.

(2) Description of the Prior Art

Television cameras are widely used for numerous purposes, and in many instances twenty-four-hours-a-day viewing is required. However, over such a period the ambient light level can vary from $10^{-4}$ lux (the darkness of a cloudy night) to $10^{+4}$ lux (bright sunlight), and this creates a problem because there is presently no single image sensor which can cope with such a wide range of light levels. It is therefore common practice either to employ two different types of camera and sensor (one for daytime, and one for night time), or to use a simple night-time camera and sensor but with optional filters for daytime use, or to provide a source of illumination for night time operation. Each solution is expensive, and the latter obviously complicates the situation when the camera is required to be hidden from view.

The problems associated with size can be mitigatd by using cameras that employ solid-state image sensors instead of the more conventional vacuum-type camera tubes. The former have much smaller size, weight and power consumption, and have the added advantage that the camera head (incorporating a lens and the image sensor) is a very small unit that can be separated from the main camera body (containing most of the necessary electronic circuitry) but joined thereto by a small multicore cable both providing the input drive supplies for the sensor and carrying the video output signals to the camera amplifier and video processing electronics in the main control unit. This type of camera is commonly referred to as a "remote-head" unit. An added advantage of the solidstate sensors is that their lifetime is virtually infinite, so that the frequency of the necessary camera maintenance is significantly reduced as compared with that for vacuum tube cameras.

Cameras using solid-state image sensors can cope satisfactorily with light levels in the range 1 lux to $10^{+4}$ lux (the normal daylight range) when used in conjunction with an automatic iris lens to control the amount of light incident on the sensor, but they do not have sufficient sensitivity to operate under night time conditions. In this latter case it is common practice to provide amplification of the illumination incident on the image sensor by means of an image intensifier, which can be coupled directly to the image sensor either using a fibre optic bundle or by means of lenses. A camera employing such a combination of intensifier and solid-state image sensor will provide a reasonable picture in ambient lighting conditions down to overcast starlight levels ($10^{-4}$ lux), but naturally cannot be employed in its basic form in daylight because the intensifier then becomes overloaded, and possibly permanently damaged. Attempts have been made to deal with this problem—to extend the range of an intensifier-using low light level camera to higher light levels—by means of an arrangement of neutral density optical filters which are automatically moved into the light path in front of the intensifier as the light level increases. This works, but does not provide the full answer, for—unlike solid-state image sensors (which, as mentioned previously, have a virtually infinite life)—the life of an image intensifier is limited to a few thousand hours of operation, and is further reduced as the signal current flowing through it is increased at the higher light levels. For short duration applications such a mode of operation is feasible, but for continuous "round-the-clock" operation it is uneconomic to employ an expensive intensifier-sensor combination for daytime viewing. Moreover, the picture quality (usually defined by the signal-to-noise ratio) obtained from an intensifier-using a low light level camera is not as high as that from an unintensified camera. For these reasons it is still common practice to employ different types of camera for daytime and night time work, despite the drawbacks of such an arrangement. The present invention, however, puts forward a solution to the problem that in itself carries no, or substantially no, associated penalities. Specifically, the invention proposes a camera incorporating both types of sensor—that is, two solid-state sensors one of which is intensified and one of which is not—in the same camera head, and "switching" one or other into operation depending upon the ambient lighting conditions. This has not previously been practical with the larger vacuum-type camera tubes, or with the relatively bulky first generation intensifiers, but is now possible with the much smaller solid state sensors and the smaller "second generation" microchannel plate image intensifiers.

SUMMARY OF THE INVENTION

In one aspect, therefore, this invention provides a television camera of the type using a solid-state image sensor, which camera includes:

(a) two separate solid-state image sensors, one of which is associated with an image intensifier while the other is not; and (b) light switching means, for switching the light received by the camera to the appropriate image sensor dependent upon the ambient light conditions.

Although the camera of the invention may be designed for use with any sort of (electromagnetic) radiation, most embodiments will be for use with visible (or Infra-Red) light. For the most part, therefore, the following description refers simply to "light", for convenience.

The invention may be employed in connection with any solid-state sensor camera—that is to say, any such camera may be fitted with a head containing two sensors (one with an associated intensifier) in place of its conventional head. Such a camera (examples are the EEV P4310 Series) has an object lens (or lens system) that focuses light onto the sensor, and an electronics package that drives the sensor and reads its output, converting the latter into a form suitable for the rest of the television system of which the camera is but a part.

Similarly, the sensor itself may be of any type (and may, indeed, be responsive to radiation—such as Infra-Red—other than visible light). One such type, whose use is described in more detail hereinafter, is the EEV P8602 solid-state image sensor, which is a front-illuminated, visible-light, frame transfer, charge coupled device (CCD). Naturally, the two sensors need not be of the same sort—one might be more sensitive than the other, or might respond to different radiation.

The camera of the invention has a head that incorporates two separate image sensors, one of which is associated wtih an image intensifier. Though in principle the intensifier could be of any variety, and could be associated with the sensor (so as to pass is intensified image light output thereto) in any way, in practice the intensifier is very preferably (because of its small size) of the type known as a "microchannel plate" intensifier, linked with the sensor by a fibre optic bundle. An example of such an intensifier is the EEV P8306, which incorporates a fibre optic bundle (on its output side) onto the output face of which the sensor can be directly mounted (conveniently by means of an optically transparent glue).

According to the invention, light switching means are used to cause the light received by the camera to pass to the image sensor appropriate to the ambient light conditions. Thus, if the ambient light level is high (or at least sufficiently so that the sensor associated with the intensifier is not required) then the light input is switched to the sensor not associated with the intensifier. Similarly, if the ambient light level is low (or at least so low that the non-intensifier sensor cannot give a decent output) then the light input is switched to the intensifier sensor.

The switching means itself may be any such means capable of causing the light input to the camera to be passed either to the one sensor or the other, as required. Most commonly such a means will consist of one or more mirror and/or less that can actually or in effect divert the incoming light in the appropriate plane to one or other sensor. For example, as in a conventional single-lens reflex photographic camera a mirror positioned so as to reflect incoming light along one pathway may be mechanically swung out of the light path so as to enable the light to proceed via a second pathway. Alternatively, a similarly-swinging mirror may in one position reflect the light along one pathway and in another reflect it along a second pathway. In another possibility a fixed but semi-silvered mirror may reflect half the light along one pathway while allowing the rest to proceed "through" the mirror along a second pathway. It is even possible to have a single pathway and to switch the two sensors (one with its intensifier) in and out of this pathway as required by physically moving them appropriately.

In one possible embodiment a "single-lens reflex" mirror system is employed in which the light reflected off the mirror forms an image on a ground glass screen, and it is light from that image that is passed (via a secondary focussing lens) to the non-intensifier sensor, while with the mirror "up" the light passes directly to the intensifier/sensor combination. The camera could, of course, be designed so that the illumination passing through the lens was focussed directly onto the non-intensifier sensor, and was deflected towards the intensifier sensor, but this is not so satisfactory since there will be a certain loss of illumination in the deflecting optical system, and it is essential to ensure that the low light level sensor receive the maximum possible amount of light.

In a presently preferred embodiment there is employed a "single lens reflex" mirror system wherein the light reflected off the mirror forms an image directly on the non-intensified sensor, while with the mirror "up" the light passes directly to the intensifier/sensor combination. A correctly orientated image may then be supplied to the display either by employing a suitably arranged and operated sensor (it can be back-illuminated, or read out in reverse) or by a subsequent electronic manipulation of the image data.

The position of the moving optical component switch means can naturally be controlled in one of several different ways. One such way is to employ a solenoid-operated mechanism activated by a photoelectric cell when the ambient light level reaches a particular value. An alternative, and preferable, method is to sense the amplitude of the video signal output level from one or other of the two sensors (whichever is currently "on") and use this to control the switchover. These sensing methods can also be used to interrupt the power supply to the intensifier when it is not in use, in order to maximize its life.

The invention permits the construction of very small, compact video cameras requiring only a single lens and power supply but capable of providing "round-the-clock" viewing without the need to provide an external source of illumination, while ensuring optimum picture quality at all times and also maximizing the image intensifier lifetime.

BRIEF DESCRIPTION OF THE DRAWINGS

Various embodiments of the invention are now described, though only by way of illustration, with reference to the accompanying Drawings in which:-

DESCRIPTION OF THE PREFERRED EMBODIMENTS

Figure 1:
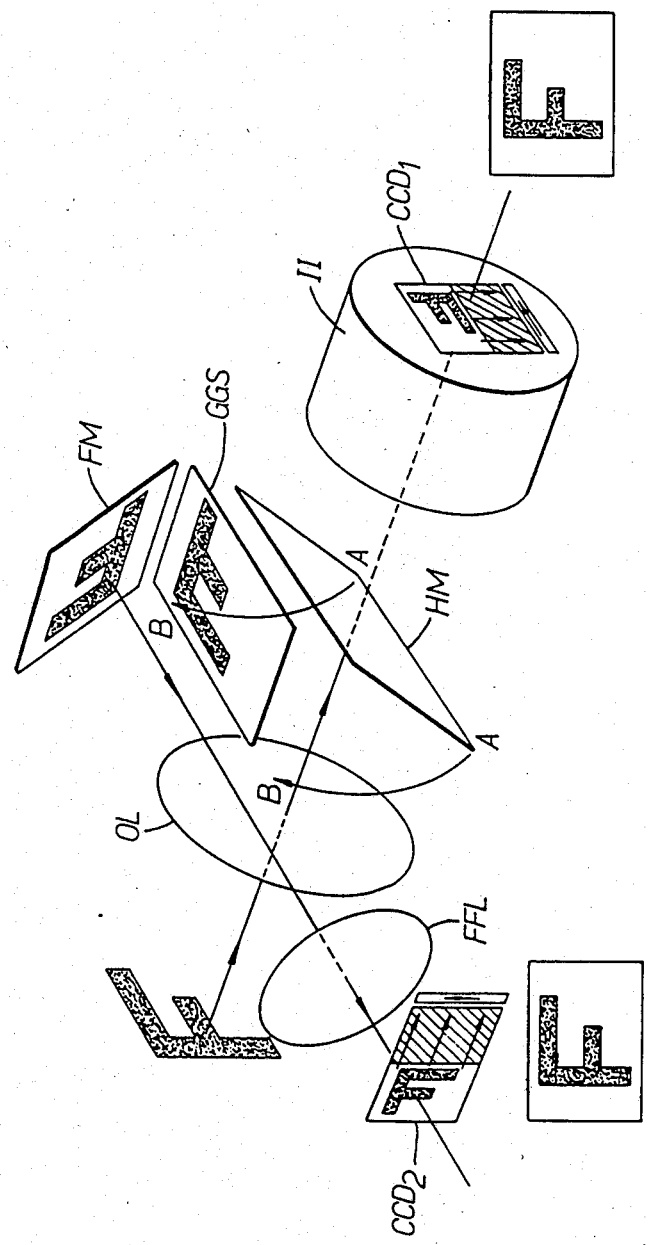
FIG. 1 shows in diagrammatic perspective view the principal components of a camera head for a solid-state sensor camera according to the invention.

The embodiment of FIG. 1 is one in which the incoming scene illumination, after passing through the camera lens, is either focussed directly onto the input window of the image intensifier coupled to a first image sensor, or is directed onto the second image sensor by means of an optical system one member of which can be moved in to or out of the light path in front of the intensifier.

The incoming light (here from an object in the form of the letter "F") passes through the objective lens (OL) and is (or is not) deflected by a moveable opaque hinged mirror (HM) from the pathway to the first sensor (charge-coupled-device $CCD_1$, which is mounted on the exit window of an image intensifier II or) to the pathway to the second sensor ($CCD_2$). Along this latter pathway it forms a real image on a ground glass pathway (GGS), and the image is used as a secondary object, its light being sent, via a fixed mirror (FM) and a fixed focus lens (FFL), on to the second sensor $CCD_2$. During daytime operation the hinged mirror is located at position "A" at 45° to the light path, while during night time operation it is located in a horizonal plane in position "B". The image intensifier II is therefore shielded from light when not in use.

With the hinged mirror HM in position "A" the object (F) is imaged onto the ground glass screen GGS situated in a horizontal plane at a distance from the centre of the 45° mirror FM equal to that from the mirror to the intensifier input window. The image on the ground glass screen is reversed in one direction by the hinged mirror HM, with respect to the image that would be formed on $CCD_1$, so that the second fixed 45° mirror FM and focussing lens are required in order to restore the final image on $CCD_2$ to the correct orientation. As shown, it is also necessary to rotate $CCD_2$ through 90° with respect to $CCD_1$.

In the arrangement of FIG. 1 the readout of each of the two CCDs has been organised (as shown by the arrows) so that their outputs are suitable for use with a conventional TV display system without further modification. It is possible, however, to read out each CCD's contents differently, and by so doing enable the optical components to be simplified. Such an arrangement is shown in FIGS. 3 and 4 discussed hereinafter.

Figure 2A:
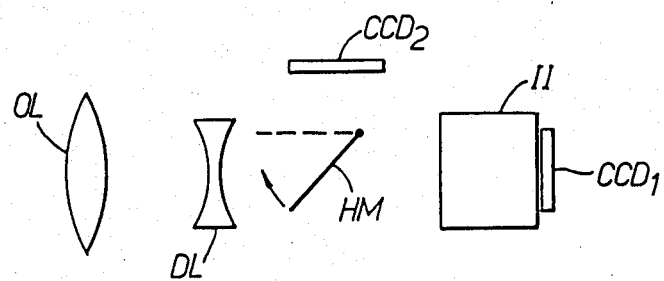
FIGS. 2A, B and C show diagrammatically variants of the optical system arrangement of FIG. 1.
Figure 2B:
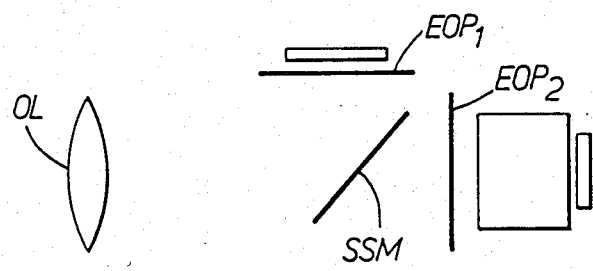
Figure 2C:
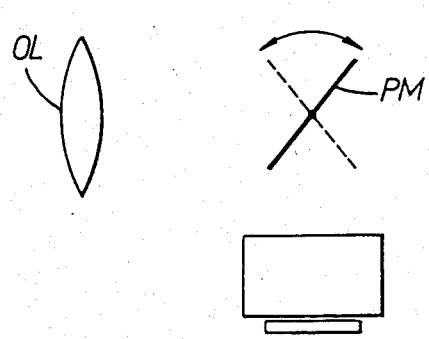

The components used in the three other possible optical arrangements of FIGS. 2A, B and C are the same or similar. In FIG. 2A the use of a divergent lens (DL) to increase the back focal distance allows the removal of the ground glass screen, etc., of FIG. 1. In FIG. 2B the FIG. 1 hinged mirror HM is replaced by a fixed semisilvered mirror (SSM), the light to the two CCD sensors then being controlled by electro-optic polarisers ($EOP_1$, $EOP_2$). Finally, in FIG. 2C the hinged mirror HM in FIG. 1 is replaced by a centrally-pivotted mirror (PM).

Figure 3:
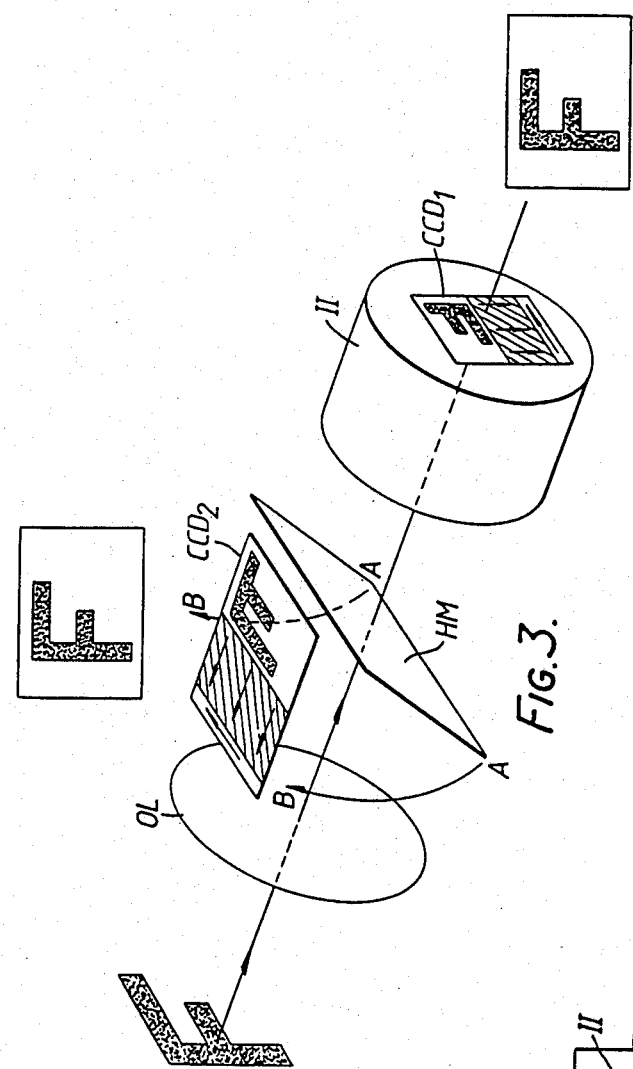
FIG. 3 shows a diagrammatic perspective view like that of FIG. 1 but of a variant like that of FIG. 2A.
Figure 4:
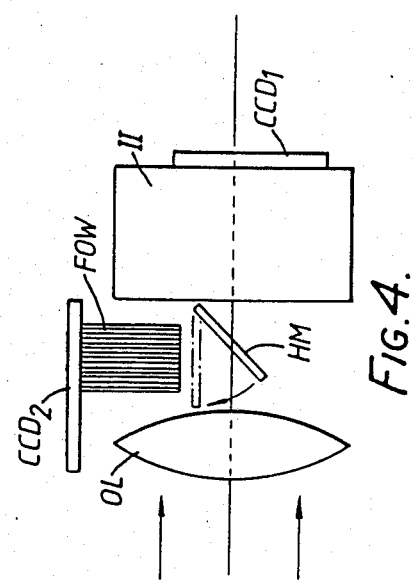
FIG. 4 shows a diagrammatic side view of a modified version of the arrangement of FIG. 3.

As shown in FIG. 3, the rather complicated optical arrangement of FIG. 1 can be simplified down to a single hinged mirror if the direction of change readout from $CCD_2$ can be made to be opposite to that from $CCD_1$. This will neutralise the image reversal introduced by the mirror, and the ground glass screen GGS can then be replaced directly by $CCD_2$.

At least three method are possible for reversing the direction of charge readout from $CCD_2$. Firstly, the CCD can be physically reversed, and the image formed on its back surface through an aperture in the ceramic package. Secondly, the CCD can be designed with an amplifier at each end of the horizontal readout register—so this output register can be read in either direction. Finally, there may be used electronic reversal techniques on the "right-way-round" image data after it has been read out.

A limitation of the arrangement shown in FIG. 3 is that the choice of objective lens is restricted to one that has a sufficiently long back focal distance in order to provide clearance for $CCD_2$. As shown in FIG. 4, this can be overcome by employing a long fibre optic window (FOW) in the imaging area of $CCD_2$, with the front surface of the fibre optic positioned at the image focal plane. This is the presently-preferred embodiment of the invention.

We claim:

1. A television camera comprising
   a single objective lens structure for receiving light from a scene;
   first and second solid state image sensors;
   an image intensifier interposed between only said first image sensor and said objective lens; and
   light switching means for switching the light received by said objective lens to either said first or said second image sensor in accordance with the ambient light conditions.

2. A camera as claimed in claim 1, wherein each of said first and second image sensors is responsive to one of visible light and infra-red radiation.

3. A camera as claimed in claim 1, wherein said image intensifier is a microchannel plate intensifier linked with said first image sensor by a fibre optic bundle.

4. A camera as claimed in claim 1, wherein the position of said light switching means is controlled by a solenoid-operated mechanism activated by the amplitude of the video signal output level from that one of the two sensors that is energized.

5. A camera as claimed in claim 1 wherein said light switching means includes a mirror positioned for receiving light from said objective lens, said mirror having a first position in which it transmits light to one of said first and second image sensors and a second position in which it is mechanically displaced to allow light to be transmitted to the other of said first and second image sensors.

6. A camera as claimed in claim 5 wherein said mirror is hinged for movement between said first and second positions, the mirror in said first position reflecting light to said second image sensor and in said second position being moved out of the path of the light from said objective lens so that said light impinges on said image intensifier for transmission to said second image sensor.

7. A camera as claimed in claim 6, wherein the light is directly reflected onto said second image sensor through a fibre optic window.

* * * * *